United States Patent
Kudo et al.

(10) Patent No.: US 8,498,794 B2
(45) Date of Patent: Jul. 30, 2013

(54) ANTI-SKID CONTROL APPARATUS CONFIGURED TO COMPENSATE FOR HYDRAULIC PRESSURE FLUCTUATIONS

(75) Inventors: Ken Kudo, Kariya (JP); Masato Terasaka, Nagoya (JP); Toru Nakaura, Nagoya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1270 days.

(21) Appl. No.: 11/927,767

(22) Filed: Oct. 30, 2007

(65) Prior Publication Data
US 2008/0103669 A1  May 1, 2008

(30) Foreign Application Priority Data
Oct. 31, 2006 (JP) .................................. 2006-296108

(51) Int. Cl.
G06F 7/00 (2006.01)
(52) U.S. Cl.
USPC ............................................ 701/83; 303/157
(58) Field of Classification Search
USPC .......... 701/70, 71, 73, 75, 78, 83, 90; 303/11, 303/157
See application file for complete search history.

(56) References Cited

U.S. PATENT DOCUMENTS

| | | | | |
|---|---|---|---|---|
| 4,962,824 A * | 10/1990 | Hagiya et al. | ................. | 180/197 |
| 5,584,543 A * | 12/1996 | Sawada | ......................... | 303/191 |
| 5,799,261 A * | 8/1998 | Ozaki et al. | ...................... | 701/78 |
| 6,027,183 A * | 2/2000 | Katayose et al. | ............. | 303/146 |
| 6,053,582 A * | 4/2000 | Ganzel | ....................... | 303/113.3 |
| 6,183,050 B1 * | 2/2001 | Ganzel | ....................... | 303/114.1 |
| 6,286,914 B1 * | 9/2001 | Sawada et al. | ............. | 303/113.2 |
| 6,312,062 B1 * | 11/2001 | Hashida | ...................... | 303/113.2 |
| 6,364,436 B1 * | 4/2002 | Sawada | ......................... | 303/191 |
| 6,378,669 B1 * | 4/2002 | Kurasako et al. | ........ | 188/218 XL |
| 6,592,192 B1 * | 7/2003 | Kaneda et al. | ................ | 303/156 |
| 6,692,088 B1 * | 2/2004 | Zheng | ........................ | 303/113.1 |
| 6,755,486 B2 | 6/2004 | Nishio et al. | | |

(Continued)

FOREIGN PATENT DOCUMENTS

| | | |
|---|---|---|
| DE | 10148074 A1 | 7/2002 |
| EP | 1101677 A1 | 5/2001 |
| JP | 2900542 B2 | 3/1999 |

OTHER PUBLICATIONS

German Office Action dated Oct. 22, 2012 issued in the corresponding German Patent Application No. 102007000565.4 and English language translation.

*Primary Examiner* — Thomas Black
*Assistant Examiner* — Sze-Hon Kong
(74) *Attorney, Agent, or Firm* — Buchanan Ingersoll & Rooney PC (57) ABSTRACT

An anti-skid control apparatus comprises an anti-skid control means for controlling a pressure reducing valve and a pressure increasing valve, each of which operated for a target wheel when an anti-skid condition is established for the target wheel, the pressure increasing valve controlled in order to linearly change a pressure difference, an estimating means for estimating an occurrence of a factor by which the brake hydraulic pressure is fluctuated at the conduit connecting the master cylinder to the pressure increasing valve for the target wheel while the pressure increasing valve is controlled for the target wheel, and an output means for generating an output for maintaining the pressure difference during a predetermining time period in which the pressure increasing valve is controlled, when the occurrence of the factor is estimated.

4 Claims, 8 Drawing Sheets

U.S. PATENT DOCUMENTS

| | | | |
|---|---|---|---|
| 7,047,121 B2* | 5/2006 | Inoue et al. | 701/81 |
| 7,165,818 B2* | 1/2007 | Iwasaki et al. | 303/115.5 |
| 7,527,339 B2* | 5/2009 | Iizuka et al. | 303/11 |
| 7,530,648 B2* | 5/2009 | Obai | 303/119.1 |
| 7,658,454 B2* | 2/2010 | Kato et al. | 303/146 |
| 8,315,772 B2* | 11/2012 | Wagner et al. | 701/78 |
| 2002/0000752 A1* | 1/2002 | Kusano et al. | 303/115.1 |
| 2002/0043874 A1* | 4/2002 | Nishio et al. | 303/114.1 |
| 2002/0163247 A1* | 11/2002 | Yonemura et al. | 303/113.1 |
| 2002/0180267 A1* | 12/2002 | Hara et al. | 303/187 |
| 2003/0201669 A1* | 10/2003 | Yokoyama et al. | 303/113.4 |
| 2004/0004394 A1* | 1/2004 | Ganzel | 303/114.1 |
| 2005/0146209 A1* | 7/2005 | Yokoyama et al. | 303/115.2 |
| 2006/0152075 A1* | 7/2006 | Goebels et al. | 303/119.1 |
| 2006/0163942 A1* | 7/2006 | Tsunehara et al. | 303/155 |
| 2007/0114842 A1* | 5/2007 | Ohkubo et al. | 303/115.1 |

* cited by examiner

ANTI-SKID CONTROL APPARATUS CONFIGURED TO COMPENSATE FOR HYDRAULIC PRESSURE FLUCTUATIONS

CROSS REFERENCE TO RELATED APPLICATIONS

This application is based on and claims priority under 35 U.S.C. §119 to Japanese Patent Application 2006-296108, filed on Oct. 31, 2006, the entire content of which is incorporated herein by reference.

FIELD OF THE INVENTION

The present invention relates to an apparatus for executing an anti-skid control (hereinafter also referred to as an ABS control) preventing slippage of each wheel.

BACKGROUND

A known anti-skid control apparatus controls a braking force, which is generated at each wheel depending on slippage of each wheel, in order to avoid locking at the wheel. For example, an anti-skid control apparatus disclosed in JP2900542B is configured as follows. The anti-skid control apparatus first calculates a difference between pressure at a master cylinder and pressure at a wheel cylinder, and depending on the calculated difference between the pressure at the master cylinder and the pressure at the wheel cylinder, a pressure difference between an upper conduit of a pressure increasing valve and a lower conduit of the pressure increasing valve is linearly changed by outputting a control signal to the pressure increasing valve including a normally-open valve for controlling pressure increased at the wheel cylinder at each wheel, as a result, the anti-skid control apparatus smoothly increases the wheel cylinder pressure. Hereinafter, the master cylinder will be referred to as a M/C, and its pressure will be referred to as M/C pressure. On the other hand, the wheel cylinder will be referred to as a W/C, and its pressure will be referred to as W/C pressure.

Specifically, the pressure increasing valve functions as a linear valve for generating the pressure difference between the upper conduit and the lower conduit of the pressure increasing valve by linearly controlling a level of an electric current value supplied to the pressure increasing valve. More specifically, by controlling the level of the electric current supplied to the pressure increasing valve, a distance between a valve seat and a valve body of the pressure increasing valve is controlled, and a valve throttling effect generated between the valve body and the valve seat is changed in order to maintain the pressure difference depending on the valve throttling effect, as a result, the pressure increasing valve can function as a linear valve.

However, in the known configuration, during an ABS control, fluid force at the upper conduit of the pressure increasing valve may fluctuate while the W/C pressure is controlled so as to linearly change by means of the pressure increasing valve. For example, when the brake pedal is further and rapidly depressed, the fluid force may fluctuate. In this case, the W/C pressure may be rapidly increased because, for example, the valve body is distanced from the valve seat so that the pressure difference depending on the throttling effect between the valve body and the valve seat can not be maintained, as a result, a performance level for linearly controlling the W/C pressure may be decreased.

A need exists for an anti-skid control apparatus which is not susceptible to the drawback mentioned above.

SUMMARY OF THE INVENTION

According to an aspect of the present invention, an anti-skid control apparatus comprises an anti-skid control means for controlling a pressure reducing valve and a pressure increasing valve, each of which operated for a target wheel selected from plural wheels when an anti-skid condition is established for the target wheel, the pressure increasing valve controlled in order to linearly change a pressure difference between a pressure in a conduit connecting a master cylinder to the pressure increasing valve and a pressure in a conduit connecting a wheel cylinder to the pressure increasing valve in a manner where a distance between a valve body and a valve seat of the pressure increasing valve is adjusted by setting a pressure increasing slope of brake hydraulic pressure applied to the wheel cylinder for the target wheel, an estimating means for estimating an occurrence of a factor by which the brake hydraulic pressure is fluctuated at the conduit connecting the master cylinder to the pressure increasing valve for the target wheel while the pressure increasing valve is controlled for the target wheel and an output means for generating an output for maintaining the pressure difference during a predetermining time period in which the pressure increasing valve is controlled, when the occurrence of the factor is estimated.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Plural embodiments of the present invention will be explained in accordance with the attached drawings. In each embodiment, reference symbols are used in the drawings to represent identical or equivalent elements.

First Embodiment

Figure 1:
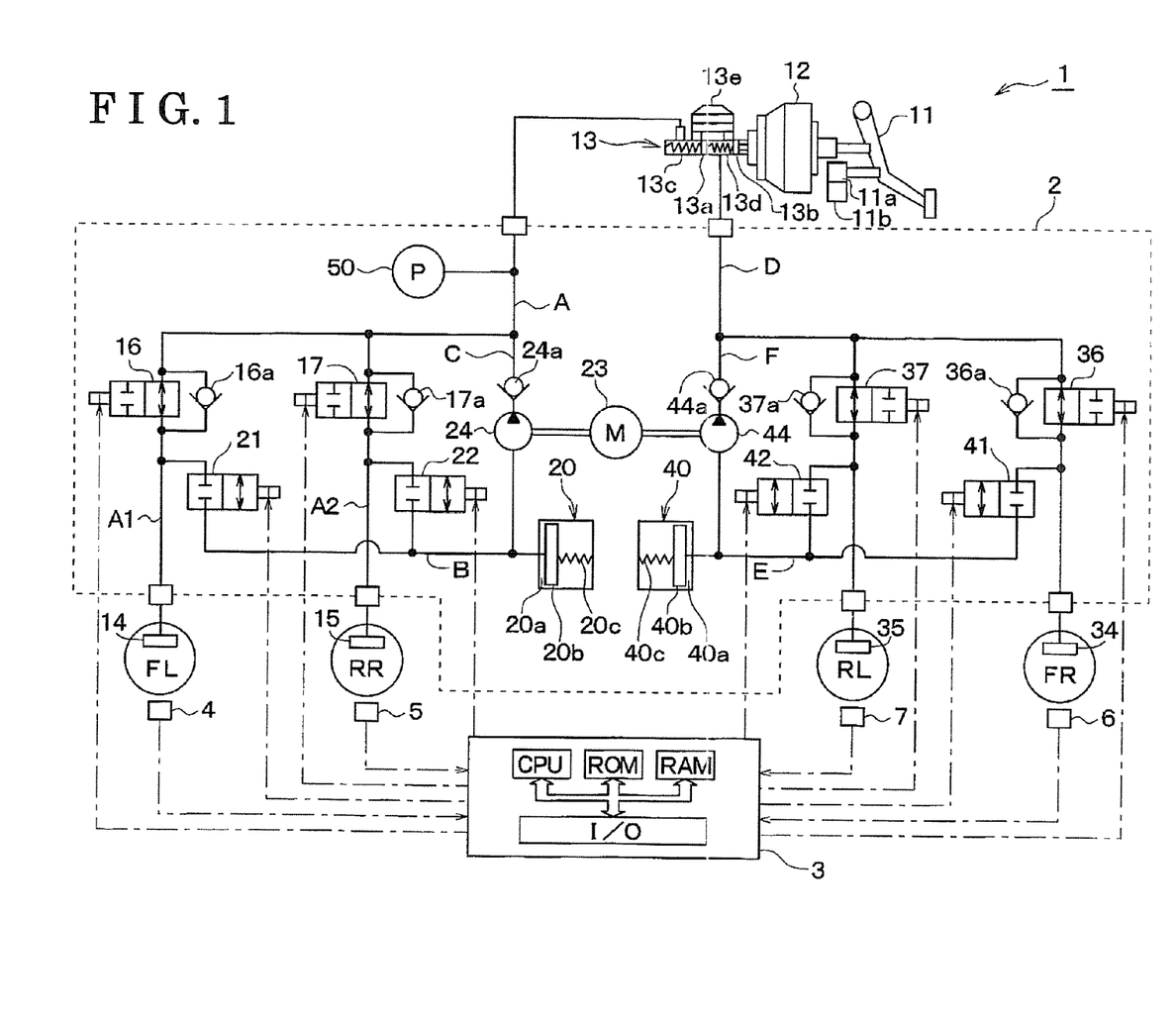
FIG. 1 illustrates a pattern diagram indicating an entire configuration of a brake hydraulic pressure control apparatus to which an ABS control apparatus according to a first embodiment of the present invention is mounted.

FIG. 1 illustrates an entire configuration of a brake hydraulic pressure control apparatus 1 for a vehicle executing an anti-skid control (hereinbelow referred to as a ABS control). The brake hydraulic pressure control apparatus 1 in the embodiment is mounted to a vehicle having four wheels. The brake hydraulic pressure control apparatus 1 may be applied to any kind of conduit systems such as a cross (X) conduit system and a front-rear conduit system. Specifically, the cross conduit system includes a first conduit system and a second conduit system, the first conduit system generating a brake hydraulic pressure for the front-left wheel FL and a rear-right wheel RR and the second conduit system generating a brake hydraulic pressure for a front-right wheel FR and a rear-left wheel RL, and the front-rear conduit system includes a front conduit system generating the brake hydraulic pressure for both front wheels FL, and FR and a rear conduit system generating a brake hydraulic pressure for both rear wheels RL and RR. The brake hydraulic pressure control apparatus 1 applied to the cross (X) conduit system will be explained in the embodiment. The brake hydraulic pressure control apparatus 1 will be explained in accordance with FIG. 1.

As illustrated in FIG. 1, the brake hydraulic pressure control apparatus 1 includes a brake hydraulic pressure controlling actuator 2, a brake ECU 3, a brake pedal 11, a booster 12, a master cylinder 13 (hereinbelow referred to as M/C 13) corresponding to a brake hydraulic pressure generating means, and heel cylinder 14, 15, 34 and 35 (hereinbelow referred to as W/C 14, 15, 34 and 35) corresponding to a braking force generating means.

The brake pedal 11 functions as a brake operating member that is depressed by a driver in order to generate a braking force for the vehicle. The brake pedal 11 is connected to the booster 12 and the M/C 13. Once the driver depresses the brake pedal 11, the depression force is boosted by the booster 12, and master pistons 13a and 13b provided in the M/C 13 are pressed by the boosted depression force. Accordingly, M/C pressure is generated in each of a primary chamber 13c and a secondary chamber 13d, both of which are defined in the M/C 13 by means of master pistons 13a and 13b.

The M/C 13 further includes a master reservoir 13e having passages for communicating with the primary chamber 13c and the secondary chamber 13d. The master reservoir 13e supplies brake fluid into the M/C 13 via the passages, and surplus brake fluid in the M/C 13 is stored in the master reservoir 13e.

The M/C pressure generated in the M/C 13 is applied to each of the W/C 14, 15, 34 and 35 through the brake hydraulic pressure controlling actuator 2. Specifically, the W/C 14 corresponds to the front-left wheel FL, the W/C 15 corresponds to the rear-right wheel RR, the W/C 34 corresponds to the front-rear wheel FR, and the W/C 35 corresponds to the rear-left wheel RL.

The brake hydraulic pressure controlling actuator 2 includes a first conduit system for generating brake hydraulic pressure for the front-left wheel FL and the rear-right wheel RR, and a second conduit system for generating brake hydraulic pressure for the front-right wheel FR and the rear-left wheel RL. The second conduit system has a configuration identical to the first conduit system.

The first conduit system includes a conduit A serving as a main conduit for transmitting the M/C pressure to the W/C 14 for the front-left wheel FL and the W/C 15 for the rear-right wheel RR. Thus, W/C pressure is generated at each W/C 14 and 15 through the conduit A.

The conduit A branches to conduits A1 and A2, and the conduit A1 is connected to the W/C 14, and the conduit A2 is connected to the W/C 15.

The conduit A1 includes a first pressure increasing valve 16 for controlling the amount of the brake hydraulic pressure applied to the W/C 14 so as to be increased, and the conduit A2 includes a second pressure increasing valve 17 for controlling the amount of the brake hydraulic pressure applied to the W/C 15 so as to be increased.

Each first and second pressure increasing valve 16 and 17 is a normally opened valve by which each of the conduits A1 and A2 are controlled to be connected (opened)/disconnected (closed) in accordance with an energized mode of a solenoid provided at each valve. When the solenoid is in a non-excitation state in which the solenoid of each first and second pressure increasing valve 16 and 17 is not energized, the first and second pressure increasing valves 16 and 17 enter the connecting state, as a result, the M/C pressure is directly applied to the W/Cs 14 and 15. Further, by adjusting the level of the electric current supplied to the solenoid of each first and second pressure increasing valve 16 and 17, a distance between a valve body and a valve seat, which are provided at each valve, is adjusted so that a pressure difference between the M/C pressure and the W/C pressure is lineally controlled. Then, when the level of the electric current supplied to the solenoid of each first and second pressure increasing valve 16 and 17 is increased so that the valve body thereof contacts the valve seat thereof, the first and second pressure increasing valves 16 and 17 each enters a disconnecting state where the M/C pressure is not applied to the W/C pressure. During a normal braking operation, executed by means of the brake pedal 11 operated by the driver, the first and second pressure increasing valves 16 and 17 each enters in a non-excitation state where the valves are controlled to be in a normally connecting (opened) state.

Further, a safety valve 16a is provided at the first pressure increasing valve 16 so as to be in parallel thereto, and a safety valve 17a is provided at the second pressure increasing valve 17 so as to be in parallel thereto. The safety valve 16a of the first pressure increasing valve 16 and the safety valve 17a of the second pressure increasing valve 17 are provided in order to reduce the W/C pressure at the front-left wheel FL and the rear-right wheel RR in response to a driver's operation of returning the brake pedal 11 while each of the first and second pressure increasing valves 16 and 17 is controlled so as to be closed during the ABS control.

Further, a first pressure reducing valve 21 and a second pressure reducing valve 22 are provided at a conduit B, which connects a portion of the conduit A1 between the first pressure increasing valve 16 and the W/C 14 to the reservoir 20, and also connects a portion of the conduit A2 between the second pressure increasing valve 17 and the W/C 15 to the reservoir 20. The conduit B functions as a pressure reducing conduit. Each first and second pressure reducing valve 21 and 22 is comprised of a normally closed valve for connecting/disconnecting the conduit between the reservoir 20 and each of the W/C 14 and 15. When a normal braking operation is executed by means of the brake pedal 11, the first and second pressure reducing valves 21 and 22 each enters in a non-excitation state where the valves are controlled to be in a normally disconnecting (closed) state.

Further, a conduit C serving as a reflux conduit is provided so as to connect the conduit A serving as the main conduit and the reservoir 20. At the conduit C, a self-suction pump 24 driven by a motor 23 is provided in order to suck/discharge brake fluid from/toward the upper portions of the first and second pressure increasing valves 16 and 17. In the first embodiment, the upper portions of the valves 16 and 17 indicates a conduit existing at the side of the M/C 13, and lower portions of the valves 16 and 17 indicates a conduit existing at the side of the W/Cs 14, 15, 34 and 35.

At a discharging port of the pump 24, a safety valve 24a is provided in order to prevent high M/C pressure being applied to the pump 24. An orifice and a damper, not illustrated in the drawings, may be provided on the conduit C at the side of the discharging port of the pump 24 so that pulsations of the brake fluid discharged by the pump 24 may be reduced.

A maximum capacity of the reservoir 20 is set to a level to which the brake fluid flows thereinto. The reservoir 20 includes a reservoir chamber 20a, a piston 20b and a spring 20c. Specifically, the piston 20b, having a predetermined stroke, and the spring 20c are provided within the reservoir chamber 20a, and the spring 20c applies a biasing force to the piston 20b so that the brake fluid in the reservoir chamber 20a can be discharged.

The reservoir 20 having such configuration discharges the brake fluid having the W/C pressure to each of the W/C 14 and 15, and also discharges the brake fluid to the pump 24 when the pump 24 starts suctioning operation.

In the same configuration as the first conduit system, the second conduit system includes conduits D, E and F, a W/C 34 for the front-right wheel FR, a W/C 35 for the rear-left wheel RL, third and fourth pressure increasing valves 36 and 37, safety valves 36a and 37a, a reservoir 40, a reservoir chamber 40a, a piston 40b and a spring 40c, pressure reducing valves 41 and 42, a pump 44 and a safety valve 44a, in order to control W/C pressure. The brake hydraulic pressure controlling actuator 2 further includes a M/C pressure sensor 50 in order to detect M/C pressure.

The brake ECU 3 illustrated in FIG. 1 functions as an ABS control apparatus of the present invention and is comprised of a known microcomputer having a CPU, a ROM, a RAM, an I/O and the like. The brake ECU 3 executes various calculations and processes such as an ABS control process by following programs memorized in the ROM or the like.

On the basis of an electric signal from the brake ECU 3, electricity supplied to the motor 23 for driving the pump 24 and the control valves 16, 17, 21 and 22 in the brake hydraulic pressure controlling actuator 2 is controlled. Accordingly, the W/C pressure generated at each W/C 14 and 15 is controlled.

Specifically, at the hydraulic pressure controlling actuator 2, for example, during the ABS control, once the brake ECU 3 supplies control electricity to the motor 23 and the solenoids for driving the control valves, each control valve 16, 17, 21 and 22 in the brake hydraulic pressure controlling actuator 2 is driven depending on the level of the electric current, and then a channel is established in the hydraulic pressure circuit. Further, brake hydraulic pressure corresponding to the established channel is generated at each W/C 14 and 15 in order to control the braking force generated at each wheels FL, FR, RL and RR.

Furthermore, the brake hydraulic pressure control apparatus 1 includes wheel speed sensors 4, 5, 6 and 7. Specifically, the wheel speed sensor 4 is provided at the wheel FL, the wheel speed sensor 5 is provided at the wheel RR, the wheel speed sensor 6 is provided at the wheel FR and the wheel speed sensor 7 is provided at the wheel RL, and each sensor outputs a speed of each wheel, in other words a pulse signal in proportion to each wheel speed, toward the brake ECU 3. Thus, on the basis of the pulse signal from the wheel speed sensors 4, 5, 6 and 7, the brake ECU 3 calculates a wheel speed at each wheel, a vehicle speed and a vehicle deceleration. Further, on the basis of the calculated wheel speed, the vehicle speed (estimated vehicle speed) and the vehicle deceleration, the brake ECU 3 executes the brake hydraulic pressure control such as the ABS control. Because a known method is used by the brake ECU 3 for calculating the vehicle speed, an explanation of the method will be omitted here.

The brake hydraulic pressure control apparatus 1 of the first embodiment is configured as mentioned above. Next, an ABS control, executed by the brake hydraulic pressure control apparatus 1, and a pressure increasing process, executed during the ABS control, will be explained. In the first embodiment, because the ABS control executed by the brake hydraulic pressure control apparatus 1 is basically identical to that in the prior art, only characteristic points of the brake hydraulic pressure control apparatus 1 according to the present invention will be intensively explained below.

Firstly, the brake ECU 3 calculates a wheel speed at each wheel FL, RR, FR and RL, a vehicle speed and a vehicle deceleration, and on the basis of the wheel speed and the vehicle speed, the brake ECU 3 calculates a slip ratio at each wheel. When the slip ratio at a wheel exceeds a predetermined threshold, an ABS control start condition (ABS condition) is fulfilled for the wheel, and the brake ECU 3 starts executing the ABS control at the wheel. The wheel at which the ABS control is executed will be referred to as a target wheel. During the ABS control, the electricity for driving the motor 23 is supplied by the brake ECU 3, a pressure control mode is selected from the pressure reducing mode, the pressure maintaining mode and the pressure increasing mode depending on a state of the target wheel, and each control valve is controlled in accordance with the selected control mode. Because the control mode is set at the brake ECU 3, the brake ECU 3 may always understand which control mode is set at each wheel FL, RR, FR and RL.

Taking the front-right wheel FR as a target wheel, an operation in each control mode during the ABS control will be explained.

When the pressure reducing mode is set, a pressure reducing process for controlling the pressure reducing valve 41 is executed. In this process, the brake ECU 33 outputs control electricity at a certain level by which the third pressure increasing valve 36 for the front-right wheel FR enters a disconnecting state, and by which the pressure reducing valve 41 for the front-right wheel FR enters a connecting state. After the abovementioned control, electricity is supplied from the brake ECU 3, the conduit between the M/C 13 and the W/C 34 is disconnected, and the conduit between the W/C 34 and the reservoir 40 is connected, so that the pressured brake fluid in the W/C 34 is discharged to the reservoir 40. As a result, the hydraulic pressure in the W/C 34 for the front-right wheel FR is reduced.

After the pressure reducing mode is continued for a predetermined time period, the pressure maintaining mode is set. Once the pressure maintaining mode is set, a pressure maintaining process is executed. In the pressure maintaining process, the brake ECU 3 outputs control electricity at a certain level by which both of the third pressure increasing valve 36 and the pressure reducing valve 41 for the front-right wheel FR enter a disconnecting state. After the abovementioned control electricity is supplied from the brake ECU 3, the conduit between the M/C 13 and the W/C 34 is disconnected, and the conduit between the W/C 34 and the reservoir 40 is disconnected, as a result, the hydraulic pressure in the W/C 34 for the front-right wheel FR is maintained.

Then, once the wheel speed of the front-right wheel FR is increased, and the slip ratio exceeds the predetermined threshold at which the pressure needs to be increased, the pressure increasing mode is set. Once the pressure increasing mode is set, a pressure increasing process for controlling the pressure increasing valve 36 is executed. In the pressure increasing process, the third pressure increasing valve 36 of the front-right wheel FR is linearly driven, and the brake ECU 3 outputs control electricity at a certain level by which the pressure reducing valve 41 enters a disconnect state.

At this point, a level of electric current for linearly driving the third pressure increasing valve 36 is calculated by setting a pressure increasing slope. Specifically, because the pressure maintaining mode is set before the pressure increasing mode is set, the control electricity has been set to a level at which the third pressure increasing valve 36 enters a disconnecting state. The level of electric current may be referred to as a maximum level (hereinafter also referred to as a fully energizing state). As the control electricity in the fully energizing state is gradually reduced, a valve element of the third pressure increasing valve 36 disengages a valve sheet of the third pressure increasing valve 36. In this manner, a balanced position is set at a point where a distance between the valve element and the valve sheet corresponds to a level of the current of the control electricity, and, a pressure difference occurs between hydraulic pressure at the upper portion of the third pressure increasing valve 36 and hydraulic pressure the lower portion of the third pressure increasing valve 36. In other words, as the current level of the control electricity is reduced, a level of the pressure difference between the hydraulic pressures at the upper portion and the lower portion of the third pressure increasing valve 36 is reduced. Thus, the W/C pressure is increased while a difference between the M/C pressure and the W/C pressure is reduced. Accordingly, the pressure increasing slope of the W/C pressure is determined on the basis of a decreasing slope of the control electricity. At this point, because the pressure increasing slope is set in a manner where the W/C pressure is increased not too rapidly, at the same time, the W/C pressure is increased at an appropriate timing (without delaying), the reducing slope of the control electricity is set in accordance with the pressure increasing slope. A method for setting the current level of the control electricity corresponding to the decreasing slope is identical to that in the prior art.

Basically, the current value of the control electricity is thus determined. However, when a certain factor is identified, a pressure increasing slope setting process is executed. For example, in this embodiment, when fluid force at the upper portion of the third pressure increasing valve 36 fluctuates, if the control electricity at the abovementioned level is supplied, the W/C pressure, which is supposed to be linearly controlled, may rapidly increase, as a result, a level of controlling performance of the W/C pressure may worsen. In order to prevent the W/C pressure from being rapidly increased, the pressure increasing slope setting process is executed in order to set the increasing slope more appropriately.

Figure 2A:
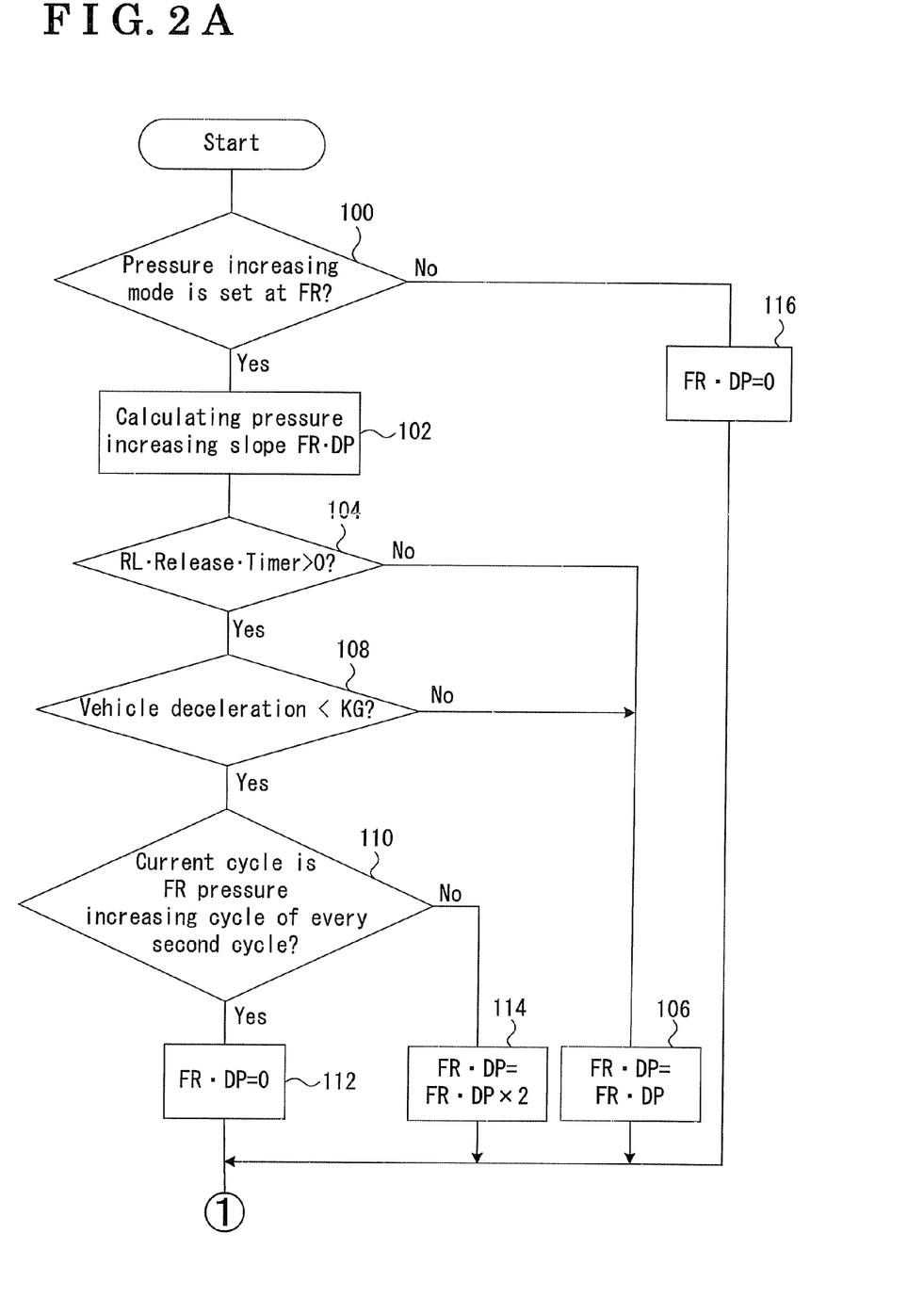
FIG. 2A illustrates a flowchart indicating a pressure increasing slope setting process.
Figure 2B:
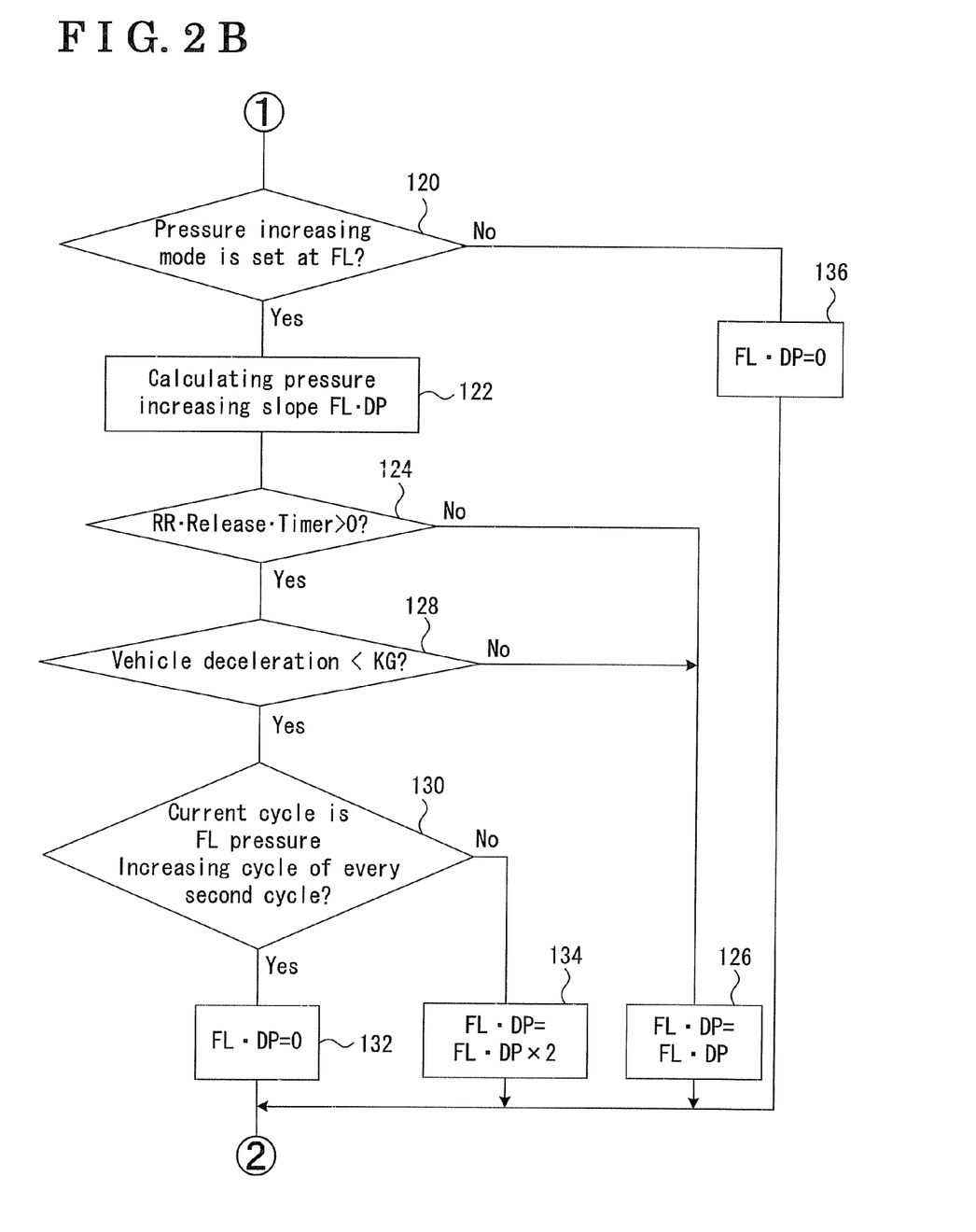
FIG. 2B illustrates a flowchart continued from the pressure increasing slope setting process of FIG. 2A.
Figure 2C:
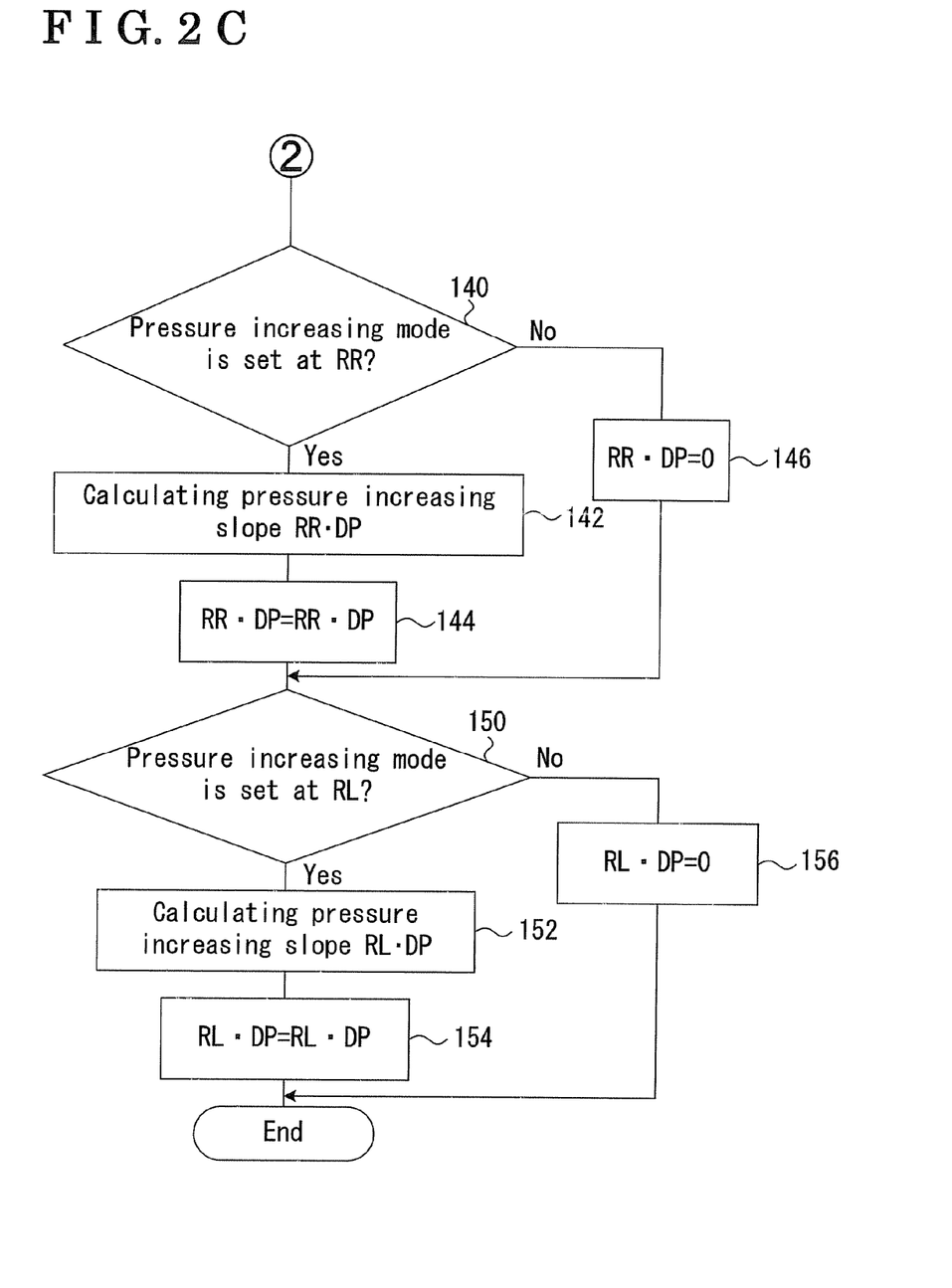
FIG. 2C illustrates a flowchart continued from the pressure increasing slope setting process of FIG. 2B.

FIGS. 2A, 2B and 2C each illustrates a flowchart of the pressure increasing slope setting process, and the pressure increasing slope setting process will be explained in detail in accordance with those drawings. In the flowcharts, the pressure increasing slope is adjusted in the pressure increasing slope setting process only for the wheels FR and FL. This is because a consumption amount of brake fluid is generally large at each front wheel FR and FL, and the rapid increment of the W/C pressure becomes particularly prominent at each front wheel. Further, the rapid increment of the W/C pressure at each front wheel FR and FL may cause pitching vibrations at the vehicle. The pressure increasing slope may be adjusted only for each rear wheel RR and RL, and the pressure increasing slope may be controlled for each front wheel FR and FL and for each of the rear wheel RR and RL.

In Step 100, the brake ECU 3 determines whether or not the pressure increasing mode is set at the front-right wheel FR. When the pressure increasing mode is set, a flag is set in the brake ECU 3, accordingly the ECU 3 can determine whether or not the pressure increasing mode is set on the basis of the flag. In this example, because the front-right wheel FR is a target wheel, the brake ECU 3 determines that the pressure increasing mode is set at the front-rear wheel FR, and the brake ECU 3 proceeds to Step 102.

In Step 102, a pressure increasing slope FR-DP is calculated. At this point, the pressure increasing slope FR-DP is calculated in the same manner as the known art where the pressure in the W/C 34 is increased not too rapidly, at the same time, the pressure in the W/C 34 is increased at an appropriate timing (without delaying). Then, the brake ECU 3 proceeds to Step 104 and determines whether or not a count value of a post-pressure reduction timer RL-Release-Timer for the rear-left wheel RL, which is provided in the same conduit system as the front-right wheel FR, exceeds "0".

The post-pressure reduction timer RL-Release-Timer for the rear-left wheel RL, is a timer housed in the brake ECU 3 in order to indicate how long has it passed since the rear-left wheel RL, which is provided in the same conduit system as the front-right wheel FR, had becomed a target wheel of the ABS control, and the pressure reducing process had been executed for the rear-left wheel RL. In the same manner as the post-pressure reduction timer RL-Release-Timer, a post-pressure reduction timer FR-Release-Timer is provided at the front-rear wheel FR, a post-pressure reduction timer FL-Release-Timer is provided at the front-left wheel FL and a post-pressure reduction timer RR-Release-Timer is provided at the rear-right wheel RR. Each post-pressure reduction timer counts the time period through an elapsed time measuring process.

Figure 3:
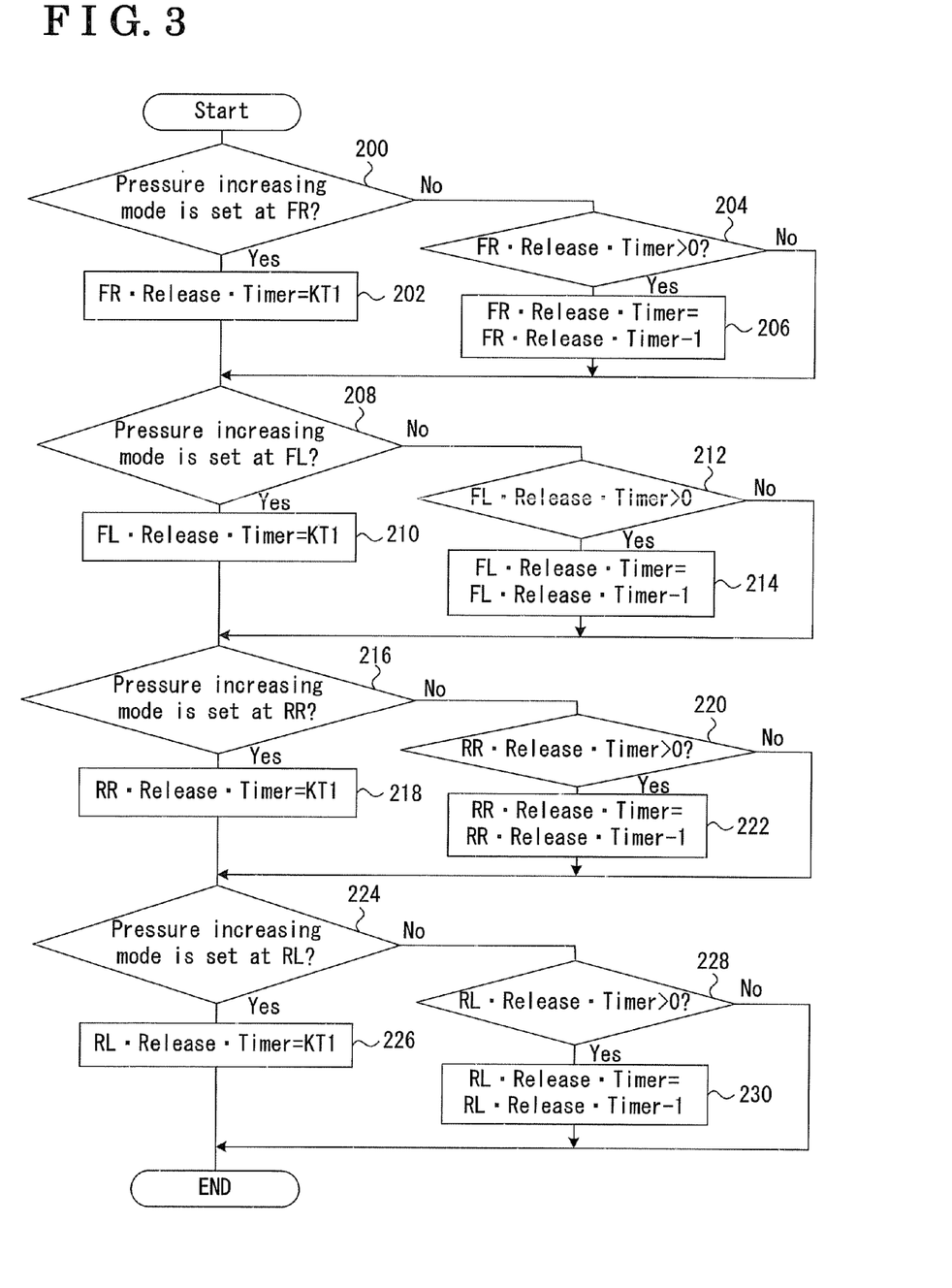
FIG. 3 illustrates a flowchart indicating an elapsed time measuring process.

FIG. 3 illustrates a flowchart indicating the elapsed time measuring process. All of the post-pressure reduction timers count the time period through the elapsed time measuring process.

First, in Step 200, the brake ECU 3 determines whether or not the front-right wheel FR is in the pressure reducing mode. When the pressure reducing mode is set as mentioned above, a flag is set in, for example, the brake ECU 3. The ECU 3 thus determines whether or not the pressure reducing mode is set at the front-right wheel FR on the basis of the flag. At this point, assuming that the pressure reducing mode is set at the front-right wheel FR, the brake ECU 3 proceeds to Step 202.

In Step 202, a count value of the post-pressure reduction timer FR-Release-Timer of the front-right wheel FR is set to KT, and at the time when the pressure reducing mode is canceled, the brake ECU 3 proceeds to Step 204. In Step 204, the brake ECU 3 determines whether or not the count value of the post-pressure reduction timer FR-Release-Timer exceeds "0". When the brake ECU 3 determines that the post-pressure reduction timer FR-Release-Timer exceeds "0", the count value of post-pressure reduction timer FR-Release-Timer, which has been set to KT, is decremented by "1". The KT1 indicates a count value of a control cycle corresponding to a certain time period, and the KT1 is set so as to correspond to a time period between a time at which the brake hydraulic pressure at the upper portion of the third and fourth pressure increasing valves 36 and 37 start fluctuating rapidly and a time at which the fluctuation is stopped. For example, when the pressure reducing mode is set at the front-right wheel FR, in the second conduit system at which the front-right wheel FR exists, the brake hydraulic pressure rapidly fluctuates at the upper portion of the third and fourth pressure increasing valves 36 and 37, and the fluctuation of the brake hydraulic pressure continues until a predetermined time period passes even after the pressure reducing mode is canceled. Thus, by calculating the count value after the pressure reducing mode is unset, the brake ECU 3 monitors whether or not a current count value reaches the post-pressure reduction timer FR-Release-Timer corresponding to KT1. Thus, the brake ECU 3 determines that the brake hydraulic pressure at the upper portion of the third and fourth pressure increasing valves 36 and 37 in the second conduit system rapidly fluctuates, or that the fluctuation is stopped.

In the same manner as Steps 200 through 206, the elapsed time measuring process is executed for the front-left wheel FL in Steps 208 through 214, for the rear-right wheel RR in Steps 216 through 222, and for the rear-left wheel RL in Steps 224 through 230. In this process, the brake ECU 3 determines that the brake hydraulic pressure at the upper portions of the first and second pressure increasing valves 16 and 17 in the first conduit system and the third and fourth pressure increasing valve 36 and 37 in the second conduit system rapidly fluctuates, or that the fluctuation is stopped.

Thus, on the basis of the obtained count value of the post-pressure reduction timer RL-Release-Timer for the rear-left wheel RL, the brake ECU 3 determines whether or not the count value of the post-pressure reduction timer RL-Release-Timer exceeds "0" in Step 104 of FIG. 2A. When the brake ECU 3 determines that the count value does not exceed "0", the brake ECU 3 proceeds to Step 106. At this point, in the second conduit system, because the brake hydraulic pressure at the upper portion of the first and second pressure increasing valves 36 and 37 does not rapidly fluctuate, the pressure increasing slope FR-DP for the front-right wheel FR calculated in Step 102 is used as a pressure increasing slope FR-DP.

On the other hand, when the brake ECU 3 determines that the count value exceeds "0" in Step 104, the brake ECU 3 proceeds to Step 108. In Step 108, the brake ECU 3 determines whether or not the vehicle deceleration is less than a threshold KG. This determination is executed in order to determine whether or not the road surface has a low friction coefficient μ (low-μ).

As mentioned above, when the pressure reducing mode is set at the rear-left wheel RL, which exists in the second conduit system in the same manner as the front-right wheel FR, so that the pressure reducing process is executed, after the brake fluid in the W/C is discharged to the reservoir 40 in order to reduce the W/C pressure for the rear-left wheel RL, the discharged brake fluid is further discharged to the upper portion of the third and fourth pressure increasing valves 36 and 37. Accordingly, the brake hydraulic pressure at the upper portion of the third and fourth pressure increasing valves 36 and 37 rapidly fluctuates.

Generally, because the wheel speed on the low μ road surface is significantly reduced comparing to on a high μ road surface, a possibility where an amount of the brake fluid discharged to the reservoirs 20 and 40 when the pressure reducing process is relatively high. Thus, in the embodiment, the pressure increasing slopes for the W/C 14, 15, 34 and 35 are adjusted only when the vehicle is running on the low μ road surface.

When the brake ECU 3 determines that the vehicle deceleration is not less than a threshold KG, the brake ECU 3 proceeds to Step 106. In step 106, the pressure increasing slope FR-DP for the front-right wheel FR calculated in Step 102 is used as a pressure increasing slope FR-DP. On the other hand, when the brake ECU 3 determines that the vehicle deceleration is less than a threshold KG in Step 108, the brake ECU 3 proceeds to Step 110 and determines whether or not a current cycle is a pressure increasing cycle of every second cycle. The pressure increasing cycle indicates a pressure increasing slope setting cycle, and in the embodiment, the pressure increasing cycle is set so as to be identical to a calculating cycle of the pressure increasing slope setting process. Further, in the embodiment, the pressure increasing cycle of every second cycle falls on every second control cycle after the pressure increasing slope setting process is started. In this embodiment, the pressure increasing cycle of every second cycle corresponds to an even number of calculated cycles.

At this point, when the brake ECU 3 determines that the current cycle is the pressure increasing cycle of every second cycle, the pressure increasing slope FR-DP for the front-right wheel FR is set to "0". On the other hand, the brake ECU 3 determines that the current cycle is not the pressure increasing cycle of every second cycle, the pressure increasing slope FR-DP for the front-right wheel FR is set to a value obtained by doubling the pressure increasing slope FR-DP (FR-DP× 2).

At this point, setting the pressure increasing slope FR-DP to "0" indicates a condition where the pressure difference between the M/C pressure and the W/C pressure is maintained. In this embodiment, in order to establish the condition where the pressure difference between the M/C pressure and the W/C pressure is maintained, the third pressure increasing valve 36 is temporally closed by supplying a control electricity by which the valve body of the third pressure increasing valve 36 contacts the valve seat of the third pressure increasing valve 36. Further, in the embodiment, in every second pressure increasing cycle, the pressure increasing slope FR-DP is set to "0" or the pressure increasing slope FR-DP is doubled. In this configuration, even when the W/C pressure can not be increased when the pressure increasing slope FR-DP is set to "0", afterwards the pressure increasing slope FR-DP is doubled so that the W/C pressure increase is prevented from being insufficient. In a case where the pressure increasing mode at the front-right wheel FR is established, the pressure increasing slope FR-DP of the front-right wheel FR is set in this way.

On the other hand, when the brake ECU 3 determines in Step 100 that the pressure increasing mode is not established for the front-right wheel FR, the brake ECU 3 proceeds to Step 116. In Step 116, the pressure increasing slope FR-DP at the front-right wheel FR is set to "0".

Then, the brake ECU 3 proceeds to Step 120. In Steps 120 through 136, processes identical to the Steps 100 through 116 are repeated for the front-left wheel FL. In this manner, in each case where the pressure increasing mode is established or not established, the pressure increasing slope FL-DP for the front-left wheel FL is set respectively.

Then, in Step 140, the brake ECU 3 determines whether or not the pressure increasing mode is established for the rear-right wheel RR. When the brake ECU 3 determines that the pressure increasing mode is established at the rear-right wheel RR, the brake ECU 3 proceeds to Step 142. In Step 142, the brake ECU 3 calculates a pressure increasing slope RR-DP for the rear-right wheel RR in the same method as in Step 102. Then, the brake ECU 3 proceeds to Step 144. In Step 144, the calculated value is set to the pressure increasing slope RR-DP for the rear-right wheel RR. On the other hand, when the brake ECU 3 determines that the pressure increasing mode is not established at the rear-right wheel RR, the brake ECU 3 proceeds to Step 146, and the pressure increasing slope RR-DP for the rear-right wheel RR is set to "0".

Then, the brake ECU 3 proceeds to Step 150. In Step 150, the brake ECU 3 further determines whether or not the pressure increasing mode is established for the rear-left wheel RL. When the brake ECU 3 determines that the pressure increasing mode is established at the rear-left wheel RL, the brake ECU 3 proceeds to Step 152. In Step 152, the brake ECU 3 calculates a pressure increasing slope RL-DP for the rear-left wheel RL, in the same manner as in Step 102. Then, the brake ECU 3 proceeds to Step 154. In Step 154, the calculated value is set to the pressure increasing slope RL-DP for the rear-left wheel RL. On the other hand, when the brake ECU 3 determines that the pressure increasing mode is not established at the rear-left wheel RL, the brake ECU 3 proceeds to Step 156, and the pressure increasing slope RL-DP for the rear-left wheel RL is set to "0".

Thus, the pressure increasing slope setting process is completed. An example of the pressure increasing slope setting process is further explained in accordance with a timing chart illustrated in FIG. 4.

Figure 4:
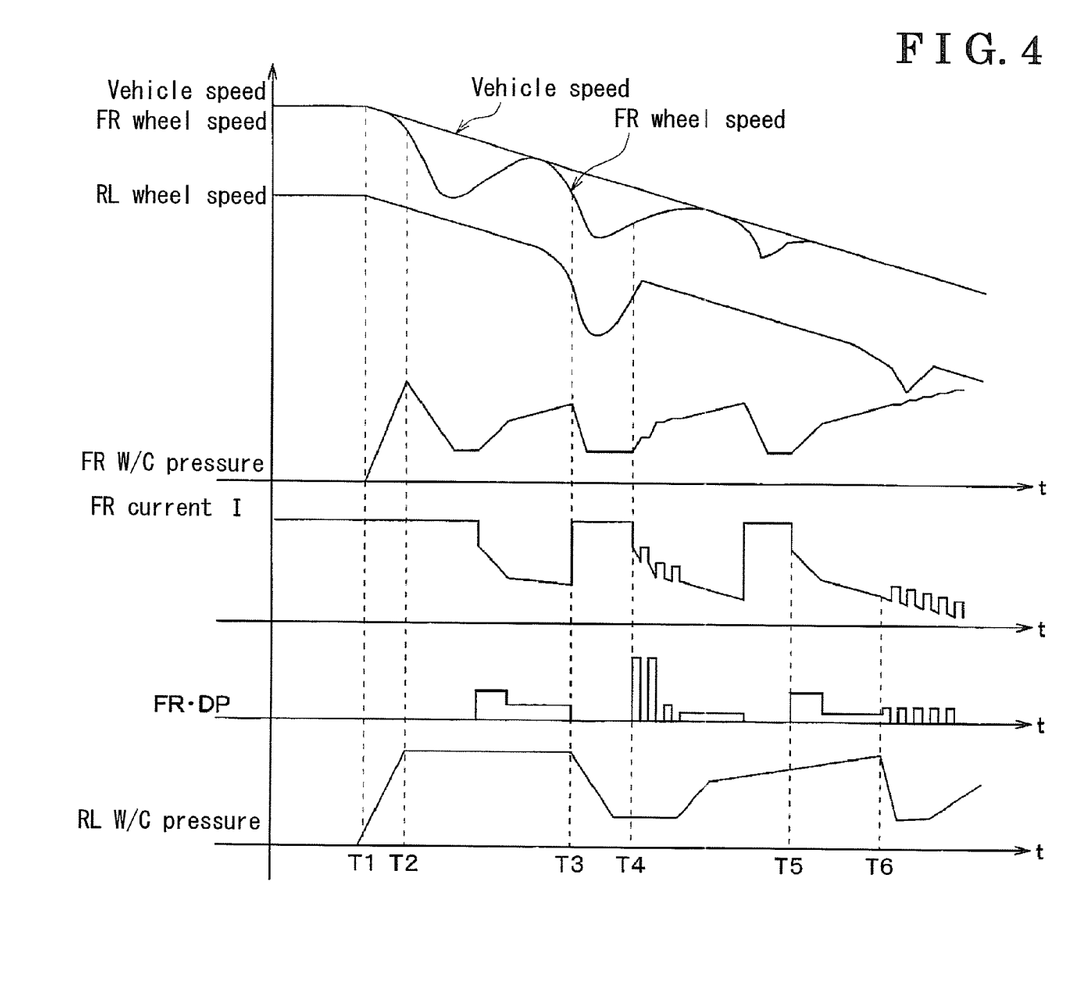
FIG. 4 illustrates timing charts of a braking operation in a case where the pressure increasing slope setting process is executed.

As illustrated in FIG. 4, when the vehicle is driven at a predetermined speed, and the driver depresses the brake pedal 11, a braking force is generated at each wheel FL, RR, FR and RL, (time T1), accordingly the vehicle speed is decreased. Thus, in this example, the wheel speed at the front-right wheel FR is decreased relative to the vehicle speed, and an ABS control is started for the front-right wheel FR (time T2). After a short period of time, the wheel speed at the rear-left wheel RL is decreased relative to the vehicle speed, and an ABS control is started for the rear-left wheel FL (time T3).

In this state, according to the pressure increasing slope FR-DP for the front-right wheel FR and the control electricity supplied to the solenoid of the third pressure increasing valve 36, the pressure increasing mode is established in Step 100 for the front-right wheel FR at a point where the wheel speed at the front-right wheel FR start returning, and then, because the pressure increasing control is started, the pressure increasing slope FR-DP is set to a predetermined value in Step 102. In this manner, the control electricity supplied to the solenoid of the third pressure increasing valve 36 is adjusted so as to correspond the pressure increasing slope FR-DP.

Next, after a second pressure reducing mode and a second pressure maintaining mode are set, when a second pressure increasing mode is set in order to restart the pressure increasing control (time 4), because the pressure increasing mode has been established in Step 100, the pressure increasing slope FR-DP is set again in Step 102. At this point (time 4), according to the time chart illustrated in FIG. 4, the ABS control for the rear-left wheel RL has already started. Further, at this point (time 4), a certain time, which is less than a predetermined time (less than the count value KT1 corresponding value), has passed since a first pressure reducing control had been executed for the rear-left wheel RL (Step 104). Accordingly, when the current pressure increasing cycle for the front-right wheel FR is every second pressure increasing cycle, the pressure increasing slope FR-DP is set to "0" in Step 112. On the other hand, when the current pressure increasing cycle is not every second pressure increasing cycle, the pressure increasing slope FR-DP is doubled in Step 114.

Then, according to the time chart illustrated in FIG. 4, after a third pressure reducing mode and a third pressure maintaining mode are set, a pressure increasing mode is set for the front-right wheel FR in order to start pressure increasing control (time T5), and then the pressure reducing mode for the rear-left wheel RL, is established (time T6). At this point, the pressure increasing slope FR-DP for the pressure increasing process of the front-right wheel FR starts been controlled. Specifically, as mentioned above, since the pressure reducing mode has been established for the rear-left wheel RL, in the same manner as the second pressure increasing mode for the front right wheel FR, if the current pressure increasing cycle for the front-right wheel FR is every second pressure increasing cycle, the pressure increasing slope FR-DP is set to "0" in Step 112. On the other hand, if the current pressure increasing cycle is not every second pressure increasing cycle, the pressure increasing slope FR-DP is doubled in Step 114.

As mentioned above, according to the brake hydraulic pressure control apparatus 1 of the first embodiment, when the pressure increasing mode of the MS control is set, for example, for the front-rear wheel FR, if the pressure reducing mode of the ABS control is set for the rear-left wheel RL, which is in the same conduit system as the front-right wheel FR, or if a certain time, which is less than a predetermined time (less than the count value KT1 corresponding value) has passed since the pressure reducing mode had been set for the rear-left wheel RL, the pressure increasing slope FR-DP of the W/C pressure for the front-right wheel FR is adjusted in a manner where the valve body contacts the valve seat at the third pressure increasing valve 36.

Then, the third pressure increasing valve 36 enters a closed state, and accordingly, even when the brake hydraulic pressure at the upper portion of the third pressure increasing valve 36 rapidly fluctuates, the W/C 34 provided at the lower portion of the third pressure increasing valve 36 can be controlled so as not to rapidly increase.

Thus, at each of the first, second, third and fourth pressure increasing valves 16, 17, 36 and 37, the control performance of the anti-skid control apparatus for linearly controlling the W/C pressure can be prevented from being lowered.

It is preferable that the maintaining time period of the third pressure increasing valve 36 is shortened in order to avoid the degradation of brake pedal feeling. Thus, the maintaining time period may be set corresponding to a characteristic of the vehicle so as not to degrade the brake pedal feeling. For example, it is known that the brake pedal feeling can be improved when the maintaining time period is set to 12 msec.

In the first embodiment, the pressure increasing slope is adjusted during the pressure increasing process only when the vehicle is driven on the low-μ road surface, however, the adjustment may be executed when the vehicle is driven on the high-μ road surface. The adjustment is particularly effective for the vehicle driven on the low-μ road surface.

Second Embodiment

Next, the second embodiment of the present invention will be explained. In the second embodiment, the brake ECU 3 of the brake hydraulic pressure control apparatus 1 executes the pressure increasing slope adjustment for the pressure increasing process during the ABS control in a different manner from that of the first embodiment.

Specifically, in the first embodiment, the determination whether or not the pressure increasing slope is adjusted is executed on the basis of the occurrence of the rapid pressure reduction within the same conduit system. On the other hand, in the second embodiment, the determination whether or not the pressure increasing slope is adjusted is executed on the basis of whether or not a large pressure reduction occurs at a wheel which is a target of the ABS control (hereinafter referred to as a target wheel).

In the second embodiment, instead of Step 104 and 124 of the first embodiment illustrated in FIG. 2, a determination whether or not a large pressure reduction occurs at the target wheel is executed. Other processes are the same as that of the first embodiment.

Specifically, in stead of the determination in Step 104 of the first embodiment, the brake ECU 3 executes determinations whether or not a count value of the post-pressure reduction timer FR-Release-Timer of the front-right wheel FR exceeds "0" and whether or not the pressure reduction amount at the front-right wheel FR is large. The post-pressure reduction timer FR-Release-Timer of the front-right wheel FR is set on the basis of the result of the elapsed time measuring process illustrated in FIG. 3, and the brake ECU 3 determines whether or not the pressure reduction amount at the front-right wheel FR is large by comparing the pressure reduction amount, which is assumed on the basis of the pressure reduction time, to a threshold.

In the same manner, instead of Step 124, the brake ECU 3 determines whether or not the count value of the post-pressure reduction timer FL-Release-Timer for the front-left FL exceeds "0" and whether or not the pressure reduction amount at the front-left wheel FL is large.

As mentioned above, when the pressure increasing slope is adjusted on the basis of whether or not the large pressure reduction occurs at the target wheel, the same effect as in the first embodiment can be obtained.

Third Embodiment

The third embodiment of the present invention will be explained. In the third embodiment, the brake ECU 3 of the brake hydraulic pressure control apparatus 1 executes the pressure increasing slope adjustment for the pressure increasing process during the ABS control in a different manner from that of the first embodiment.

In the third embodiment, using a M/C pressure sensor 50 provided at the brake hydraulic pressure control apparatus 1 illustrated in FIG. 1, the brake ECU 3 determines whether or not the pressure increasing slope adjustment is executed on the basis of the fluctuation of the M/C pressure.

In this process, instead of Steps 104 and 124 of the first embodiment illustrated in FIG. 2, a determination whether or not a time period after the fluctuation of the M/C pressure exceeds a predetermined threshold (elapsed time of fluctuation) reaches a predetermined time period. Other processes are the same as that of the first embodiment.

Figure 5:
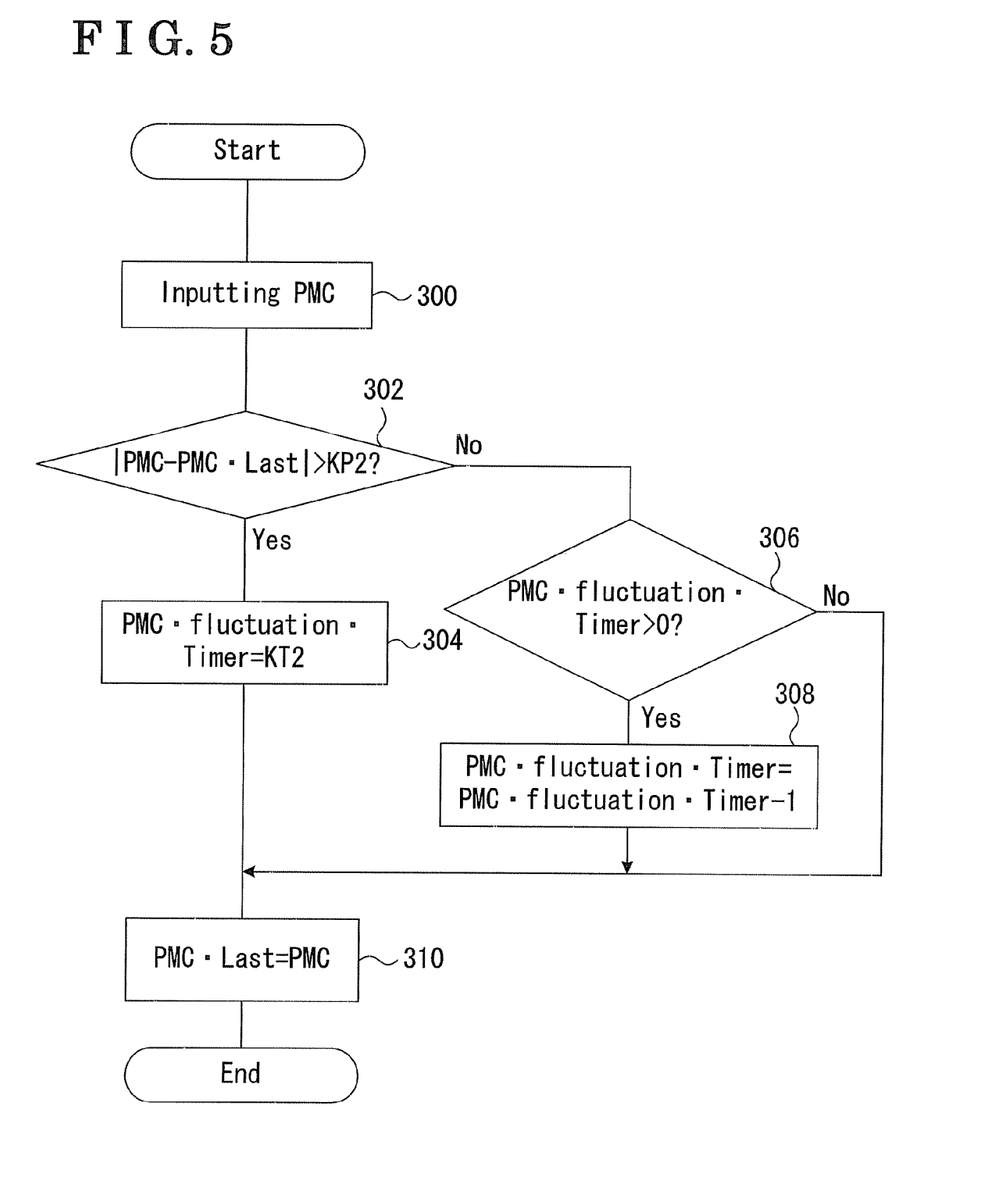
FIG. 5 illustrates a flowchart indicating an elapsed time of fluctuation measuring process.

Specifically, the determination process is executed on the basis of the result obtained by an elapsed time of fluctuation measuring process. FIG. 5 illustrates a flowchart of the elapsed time of fluctuation measuring process.

First, in Step 300, the M/C pressure (PMC) is inputted by reading a detection value in the M/C pressure sensor 50. Then, in Step 302, the brake ECU 3 determines whether or not an absolute value of a difference between the current M/C pressure and a previous M/C pressure (PMC-Last) is larger than a threshold KP2. At this point, the threshold KP2 is a reference value at which the fluctuation of the M/C pressure may be assumed to be large.

When the brake ECU 3 determines that the absolute value is larger than the threshold KP2, the process goes to Step 304. In Step 304, KT2 is set to a post fluctuation timer PMC-fluctuation-Timer indicating the elapsed time of fluctuation, and the process is terminated. At this point, the KT2 indicates a count value of a control cycle corresponding a certain time period, and the KT2 is set so as to correspond a time period between a time at which the fluctuation of the M/C pressure start increased and a time at which the fluctuation is stopped. When the fluctuation of the M/C pressure is increased, it takes some time until the fluctuation is stopped. Thus, by calculating the elapsed time of fluctuation, the brake ECU 3 monitors whether or not a current count value reaches the post fluctuation timer PMC-fluctuation-Timer corresponding to KT2

On the other hand, when it is determined that the absolute value is not larger than the threshold KP2, the process goes to Step 306. In Step 306, the brake ECU 3 determines whether or not the post fluctuation timer PMC-fluctuation-Timer exceeds "0". When the brake ECU 3 determines that the post fluctuation timer PMC-fluctuation-Timer exceeds "0", the process goes to Step 308. In Step 308, the post fluctuation timer PMC-fluctuation-Timer is decremented by "1", and the process goes to Step 310. When the brake ECU 3 determines that the post fluctuation timer PMC-fluctuation-Timer does not exceed "0", the process goes to Step 310. In Step 310, the M/C pressure inputted in Step 300 is changed to the previous value, and the process is terminated.

In this way, because the elapsed time of fluctuation is measured in the elapsed time of fluctuation measuring process, instead of Steps 104 and 124 illustrated in FIG. 2, the brake ECU 3 determines whether or not the count value of the post fluctuation timer PMC-fluctuation-Timer indicating the elapsed time of fluctuation exceeds "0". Then, only when the brake ECU 3 determines that the count value exceeds "0", the pressure increasing slope is adjusted.

As mentioned above, when the pressure increasing slope is adjusted on the basis of the fluctuation of the M/C pressure, the same effect as in the first embodiment can be obtained.

Fourth Embodiment

The fourth embodiment of the present invention will be explained. In the fourth embodiment, the brake ECU 3 of the brake hydraulic pressure control apparatus 1 executes the pressure increasing slope adjustment for the pressure increasing process during the ABS control in a different manner from that of the first embodiment.

In the fourth embodiment, the brake ECU 3 determines whether or not the pressure increasing slope is adjusted on the basis of a required value of rotation numbers (e.g., speed) of the motor 23.

In this process, instead of Steps 104 and 124 of the first embodiment illustrated in FIG. 2, the brake ECU 3 determines whether or not the required value of rotation number of the motor 23 exceeds a predetermined threshold. Other processes are the same as that of the first embodiment.

Specifically, the required value of rotation numbers of the motor 23 is pre-calculated by the brake ECU 3 in accordance with, for example, the brake fluid amounts in the reservoirs 20 and 40 during the ABS control. Because the required value of rotation numbers of the motor 23 is calculated in a know way, detailed explanations will be omitted. The required value of rotation number of the motor 23 is obtained by confirming the value calculated by the brake ECU 3.

Then, in Steps 104 and 124, the brake ECU 3 determines whether or not the required value of rotation number of the motor 23 exceeds a threshold kRPM. The pressure increasing slope is adjusted only when the required value of rotation number exceeds the threshold kRPM.

As mentioned above, when the pressure increasing slope is adjusted on the basis of the required value of rotation number of the motor 23, the same effect as in the first embodiment can be obtained.

Fifth Embodiment

The fifth embodiment of the present invention will be explained. In the first embodiment, the pressure increasing cycle corresponds to the control cycle of the pressure increasing slope setting process, however, in the fifth embodiment, the pressure increasing cycle does not corresponds to the control cycle of the pressure increasing slope setting process.

Figure 6:
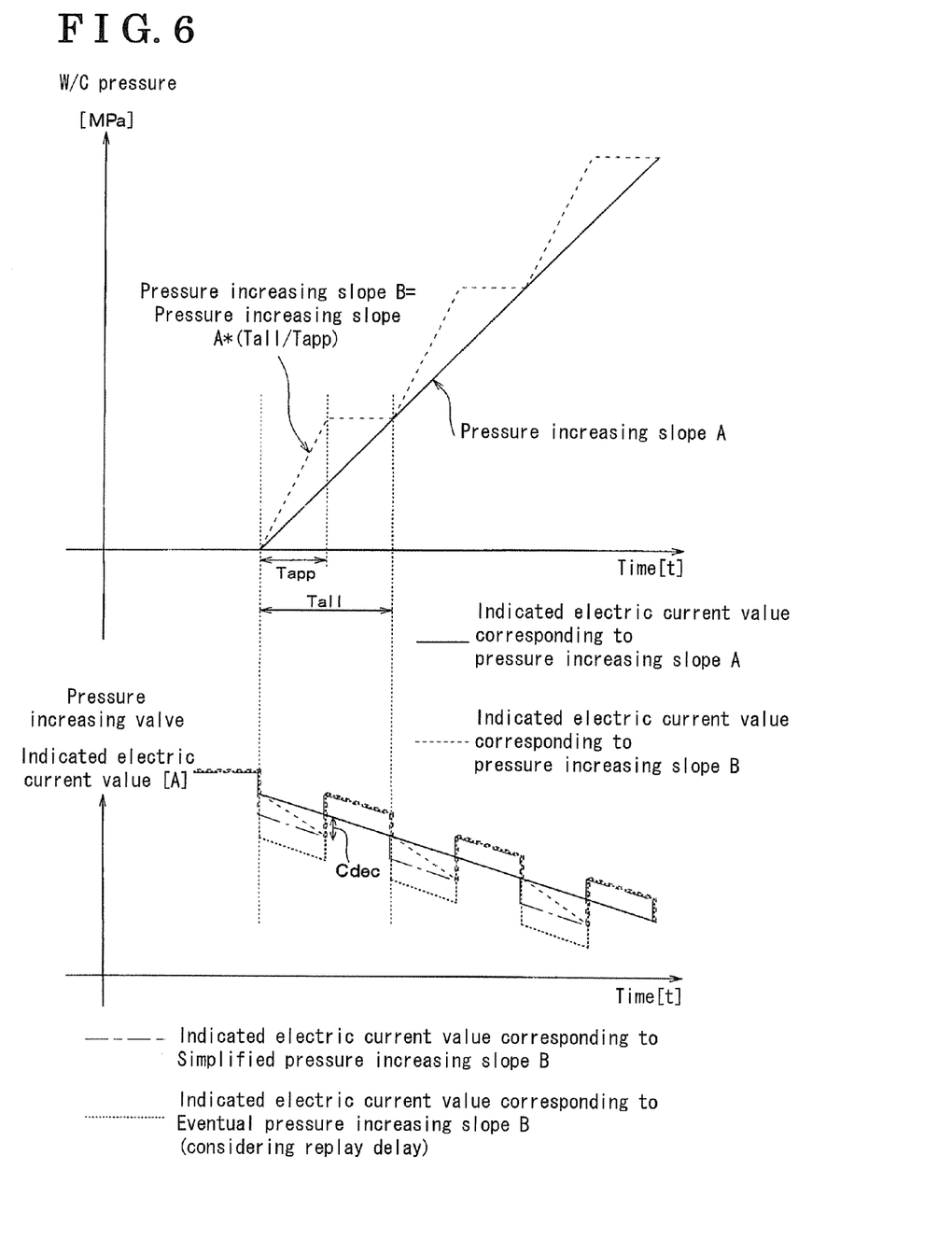
FIG. 6 illustrates a relation between a pressure increasing slope A calculated in a known method and a pressure increasing slope B being adjusted, and indicated electric current values corresponding to each pressure increasing slope A and B.

FIG. 6 illustrates a relation between a pressure increasing slope A calculated by means of a known method and a pressure increasing slope B which has been adjusted, and indicated electric current values corresponding to the pressure increasing slopes A and B. The pressure increasing slope A calculated by means of the known method corresponds to each pressure increasing slope FR-DP and FL-DP for each of the front-right wheel FR and the front-left wheel FL calculated in Steps 102 and 122 illustrated in FIGS. 2A and 2B. On the other hand, the pressure increasing slope B corresponds to each of the adjusted pressure increasing slopes FR-DP and FL-DP.

When the slope is not adjusted, a time period in which the W/C pressure is increased to a certain point so as to be along the pressure increasing slope A is indicated by a time period Tall, and a time period in which the W/C pressure is increased to the certain point so as to be along the pressure increasing slope B is indicated by a time period Tapp. At this point, if the time period Tall corresponds to two cycles of the control cycle, and the time period Tapp corresponds to one cycle of the control cycle, the pressure increasing cycle equals to the control cycle as explained in the first embodiment. However, there is a possibility that the time period Tall corresponds to, for example, five cycles of the control cycle, and that the time period Tapp corresponds to, for example, two cycles of the control cycle. Thus, the pressure increasing slope B may be obtained by using a formula: Pressure increasing slope B=Pressure increasing slope A×(Tall/Tapp). Using the pressure increasing slope B obtained by the above formula, the W/C pressure may be increased to the certain level to which the W/C pressure is increased within the time period Tall using the pressure increasing slope A.

Further, when the pressure increasing slope B is set as mentioned above, the indicated electric current value corresponding to the pressure increasing slope B may be set so as to be higher than the indicated electric current value corresponding to the pressure increasing slope A illustrated in FIG. 6 with a solid line. However, in order to calculate the indicated electric current value accurately corresponding to the pressure increasing slope B, the brake ECU 3 needs to compute on the basis of a complicated program, as a result, a level of burden on the brake ECU 3 may be increased. In order to simplify the program for calculating the indicated electric current value, a difference between an increased value of the W/C pressure increased on the basis of the pressure increasing slope B at an end point of the time period Tapp and an increased value of the W/C pressure increased on the basis of the pressure increasing slope A at an end point of the time period Tapp is calculated. Further, a reduced value Cdec of the indicated electric current value corresponding to the abovementioned difference is calculated, and a value obtained by deducting the reduced value Cdec from the indicated electric current value corresponding to the pressure increasing slope A is used as an indicated electric current value corresponding to the pressure increasing slope B.

However, in fact an actual pressure increasing slope may be smaller than the pressure increasing slope D due to a response delay of the pressure increasing valves 16, 17, 36 and 37. Thus, in consideration of the abovementioned response delay, the indicated electric current value corresponding to the pressure increasing slope B may be further reduced by a certain value.

Other Embodiments

Each embodiment is explained by pointing out each factor by which the pressure increasing slope adjustment is executed, however, the pressure increasing slope may be adjusted when at least one of the abovementioned factors is identified.

Further, in each embodiment, the adjustment of the pressure increasing slope is executed when the vehicle is driven on the high-Ξ road surface because the adjustment is particularly effective for the vehicle driven on the low-μ road surface, however, the adjustment of the pressure increasing slope may be effective when the pressure increasing slope of the target wheel is relatively large. Specifically, in those cases, because a possibility where the W/C pressure is rapidly increased is high, the pressure increasing slope may be adjusted.

For example, when the difference between the M/C pressure and the W/C pressure is relatively large, the pressure increasing slope at the target wheel becomes large. A difference between a detection value of the M/C pressure sensor 50 and a detection value of a W/C pressure sensor provided at each wheel is compared to a predetermined threshold. Further, because the indicated electric current value supplied to the solenoids of each of the first through fourth pressure increasing valves 16, 17, 36 and 37 indicates the difference, the difference between the M/C pressure and the W/C pressure may be determined on the basis of the difference assumed from the indicated electric current value. Furthermore, because the pressure increasing slope for the target wheel is calculated in Steps 102 and 122, the calculated pressure increasing slope may be compared to a predetermined threshold.

In the configuration explained in each embodiment, the M/C 13 and each W/C 14, 15, 34 and 35 are directly connected through the conduit A and the like, however, the present invention may be applied to an anti-skid control apparatus having a configuration in which the M/C 13 and each E/C 14, 15, 34 and 35 are mechanically separated, such as a brake by wire system. Further, the Steps illustrated in each drawing correspond to means for executing each process. Specifically, in the above explanations, the explanation of known method according to the ABS control is simplified or omitted, however, the brake ECU serves as an estimating means and an output means. More specifically, when the anti-skid control or the pressure increasing process for the target control is executed, the estimating means estimates an occurrence of the factor by which the brake hydraulic pressure is fluctuated at the upper portion of the pressure increasing valve corresponding to the target wheel, and when the occurrence of the factor is estimated, the output means generates the output in order to control the valve body so as to be seated on the valve seat and maintains the pressure difference between the upper portion of the pressure increasing valve and the lower portion of the pressure increasing valve. Further, Steps 102, 106, 122, 126, 142, 144, 152 and 154 executed by the brake ECU 3 correspond to an anti-skid control means, Steps 104 and 124 executed by the brake ECU 3 correspond to the estimating means, and Steps 112 and 132 executed by the brake ECU 3 correspond to the output means.

According to the embodiment of the present invention, even when the brake hydraulic pressure in the conduit connecting the pressure increasing valve to the master cylinder rapidly fluctuates, the pressure in the wheel cylinder connected to the pressure increasing valve may not be rapidly increased. Thus, controlling performance of the anti-skid control apparatus by which the W/C pressure is linearly controlled by means of the pressure increasing valve may be secured.

Generally, in order to stop the rapid increment of the pressure in the wheel cylinder due to some factors, the pressure difference between the conduit connecting the pressure increasing valve to the master cylinder and the conduit connecting the pressure increasing valve to the wheel cylinder may be maintained continuously. In this case, the pressure increasing valve may generate its operational noise continuously. According to the embodiment of the present invention, the occurrence of the factor is estimated first, and only when the occurrence of the factor is estimated, the pressure difference between the conduit connecting the pressure increasing valve to the master cylinder and the conduit connecting the pressure increasing valve to the wheel cylinder may be maintained. Thus, the level of the operational noise at the pressure increasing valve may be reduced.

Generally, because the wheel speed on the low μ road surface is significantly reduced comparing to on a high μ road surface, a possibility where an amount of the brake fluid discharged to the reservoirs when the pressure reducing process is relatively high. Thus, according to the embodiment, the pressure increasing slopes are adjusted only when the vehicle is running on the low μ road surface.

According to the embodiment of the present invention, it is effective for preventing the W/C pressure from being increased by adjusting the pressure increasing slope when the pressure increasing slope for the wheel cylinder of the target wheel is larger than a threshold.

According to the embodiment of the present invention, the output means sets a pressure increasing slope (B), which is higher than the pressure increasing slope (A) set by the anti-skid control means during a second time period (Tapp) in a first time period (Tall) in a manner where the pressure increasing slope during a remaining time period in the first time period (Tall) is set to zero, and a pressure increasing slope during the second time period (Tapp) is set to a value obtained by multiplying the pressure increasing slope (A) set by the anti-skid control means by a value obtained by dividing the first time period by the second time period. Thus, the even when the pressure increasing slope is adjusted, the pressure may be increased appropriately.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An anti-skid control apparatus comprising:
an anti-skid control means for controlling a pressure reducing valve and a pressure increasing valve, each of which operated for a target wheel selected from plural wheels when an anti-skid condition is established for the target wheel, the pressure increasing valve controlled in order to linearly change a pressure difference between a pressure in a conduit connecting a master cylinder to the pressure increasing valve and a pressure in a conduit connecting a wheel cylinder to the pressure increasing valve in a manner where a distance between a valve body and a valve seat of the pressure increasing valve is adjusted by setting a pressure increasing slope of brake hydraulic pressure applied to the wheel cylinder for the target wheel;
a pump for discharging brake fluid to the conduit connecting the master cylinder to the pressure increasing valve;
a motor controlled by the anti-skid means to drive the pump;
an estimating means for estimating an occurrence of a factor by which the brake hydraulic pressure on the master cylinder side at the pressure increasing valve fluctuates rapidly relative to the brake hydraulic pressure on the wheel cylinder side at the pressure increasing valve; and
an output means for generating an output for maintaining the pressure increasing valve in a disconnecting state during a predetermined time period in which the pressure increasing valve is controlled, when the occurrence of the factor is estimated,
wherein the estimating means estimates the occurrence of the factor when the anti-skid control is executed for a wheel provided in a same conduit system as that of the target wheel, the pressure reducing valve is controlled for the wheel provided in the same conduit system as that of the target wheel, and the brake fluid is discharged by the pump to the conduit connecting the master cylinder to the pressure increasing valve, or when the anti-skid control is executed for a wheel provided in a same conduit system as that of the target wheel, the brake fluid is discharged by the pump to the conduit connecting the master cylinder to the pressure increasing valve, and before a predetermined time has passed since the pressure reducing valve had been controlled for the wheel provided in the same conduit system as that of the target wheel.

2. The anti-skid control apparatus according to claim 1, wherein the output means maintains the pressure difference when a friction coefficient of a road surface is less than a predetermined threshold.

3. The anti-skid control apparatus according to claim 1, wherein the output means maintains the pressure difference when the pressure increasing slope of the wheel cylinder for the target wheel is larger than a predetermined threshold.

4. The anti-skid control apparatus according to claim 1, wherein the output means sets a pressure increasing slope, which is higher than the pressure increasing slope set by the anti-skid control means during a second time period in a first time period, in a manner where the pressure increasing slope during a remaining time period in the first time period is set to zero and a pressure increasing slope during the second time period is set to a value obtained by multiplying the pressure increasing slope set by the anti-skid control means by a value obtained by dividing the first time period by the second time period.

* * * * *